United States Patent [19]
Grillet

[11] 4,298,240
[45] Nov. 3, 1981

[54] CABLE CONNECTOR

[76] Inventor: Jacques Grillet, 54, Route de Saint-Nizier, Seyssins (Isere), France

[21] Appl. No.: 117,768

[22] Filed: Feb. 1, 1980

[30] Foreign Application Priority Data

Feb. 2, 1979 [FR] France ................................ 79 03398

[51] Int. Cl.$^3$ ............................................. H01R 11/15
[52] U.S. Cl. .................................... 339/109; 339/245; 339/264 L
[58] Field of Search ................... 339/109, 245, 263 R, 339/263 L, 264 L, 265 F, 266 L, 276 D

[56] References Cited

U.S. PATENT DOCUMENTS 1,946,752  2/1934  Miller ..................................... 24/125
2,866,844  12/1958  Klosin .................................... 174/79

FOREIGN PATENT DOCUMENTS 539343  11/1931  Fed. Rep. of Germany .
2211234  1/1973  Fed. Rep. of Germany .
653478  3/1929  France .
2040671  1/1971  France .
2156510  6/1973  France .

Primary Examiner—John McQuade
Attorney, Agent, or Firm—Karl F. Ross

[57] ABSTRACT

A cable connector, especially for attaching a tap to an aerial cable or electric line, comprises a sleeve adapted to be clamped to the aerial cable and carrying a cylindrical pin or peg on a foot projecting outwardly from this sleeve. A clamp which can be tightened by a screw can engage the pin and the screw head is formed as a shackle or eye so that the assembly can be made from a remote location and tightened by means of a pole whose hook engages in the shackle.

26 Claims, 25 Drawing Figures

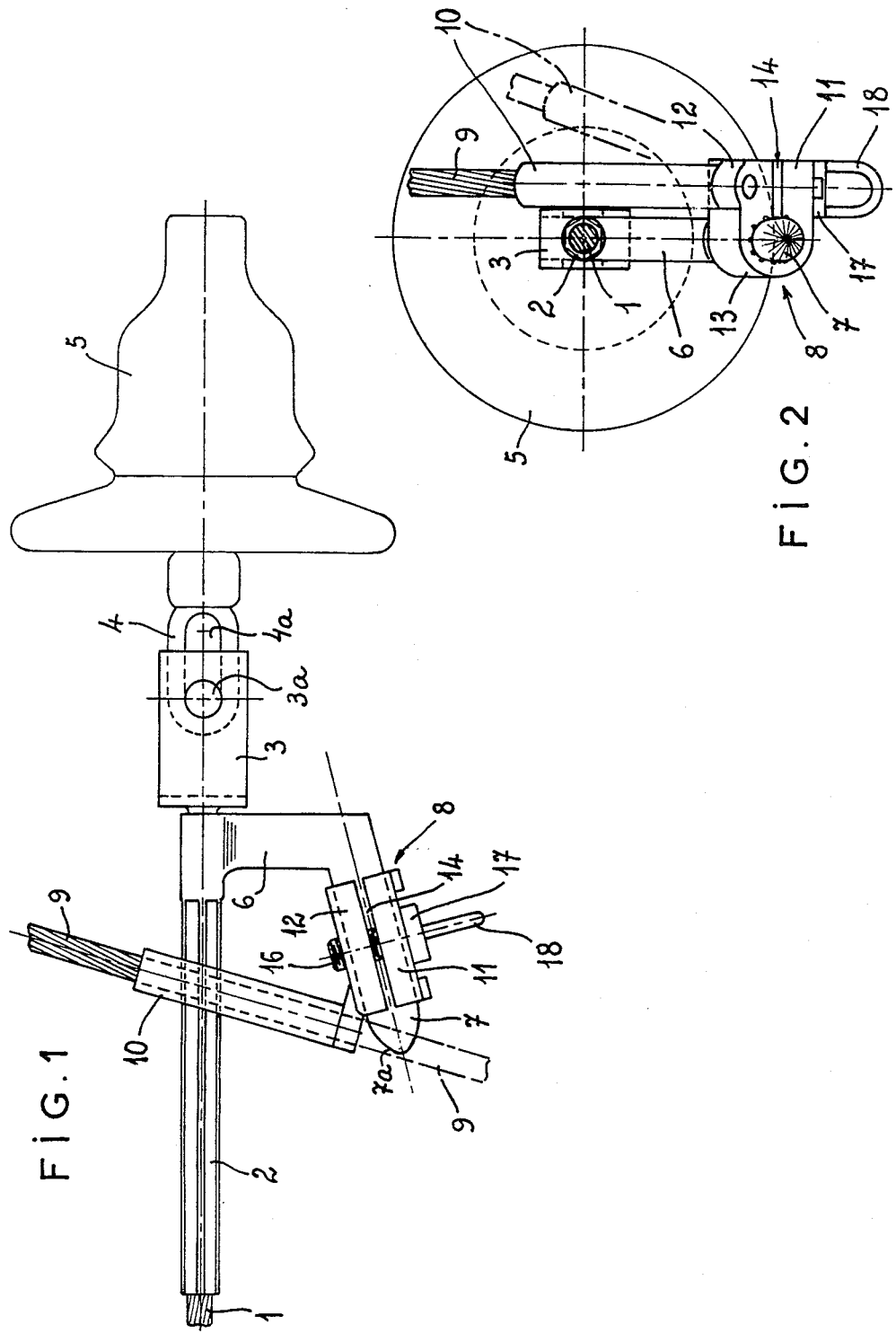

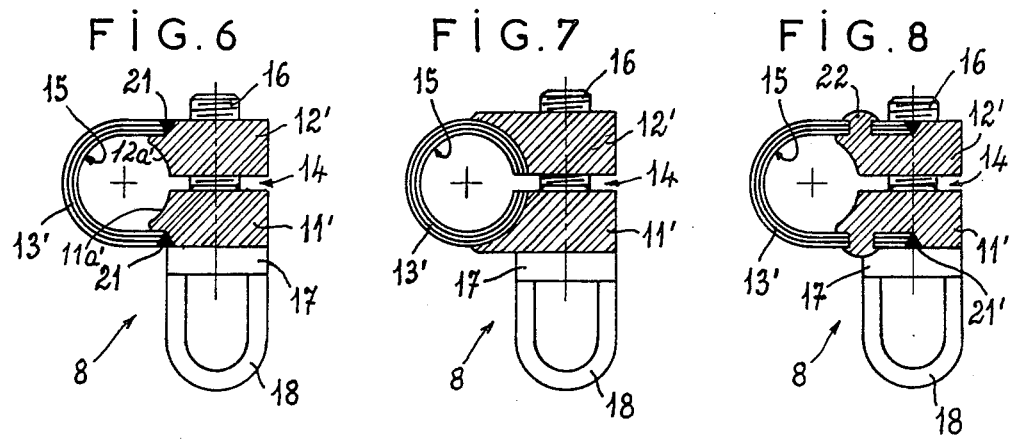
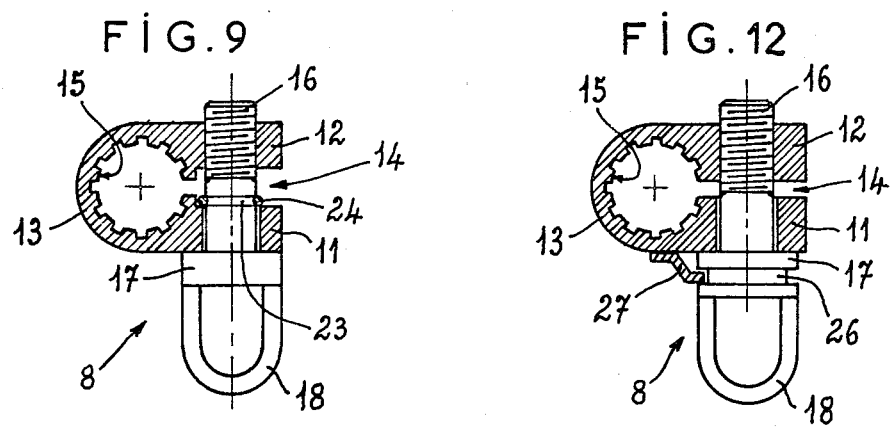
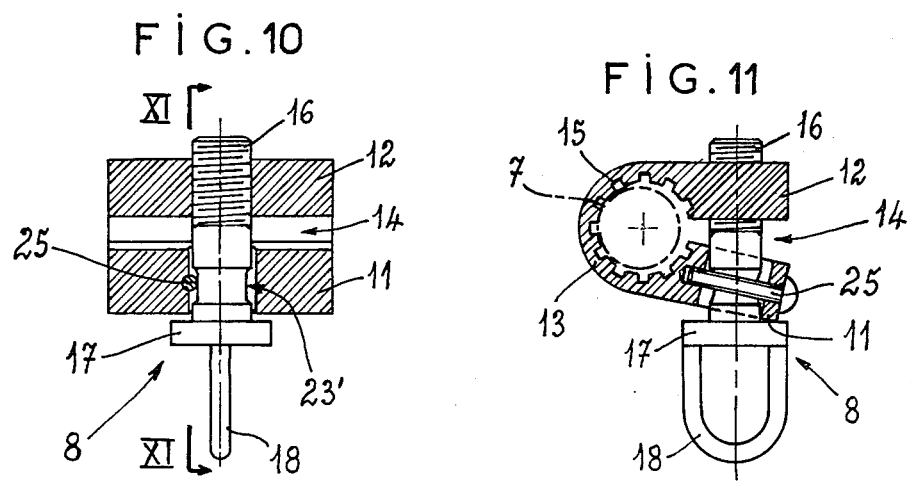

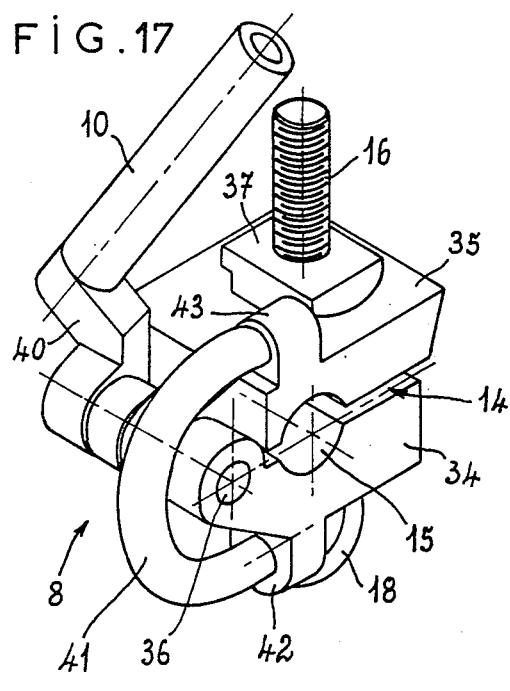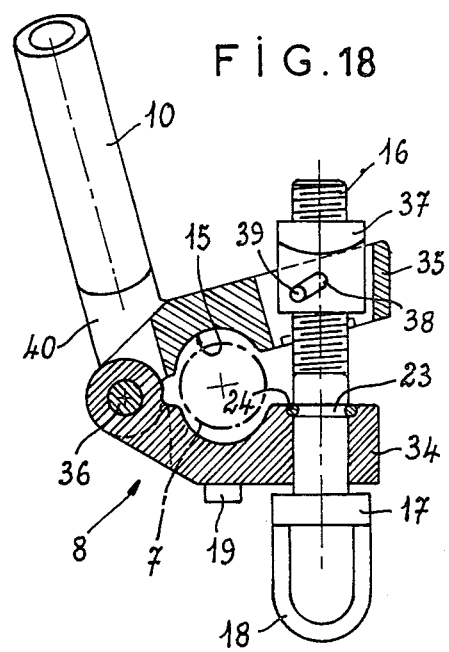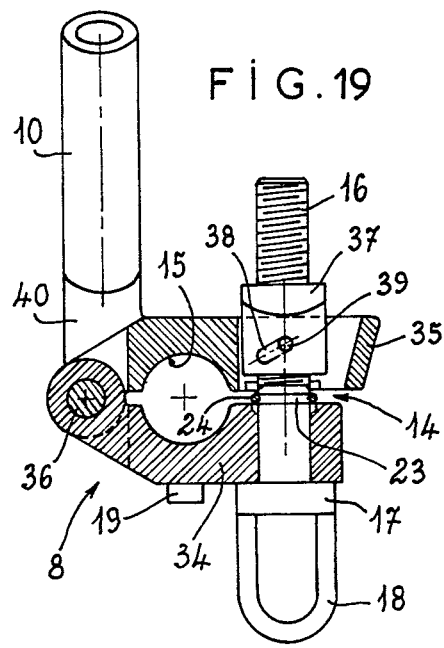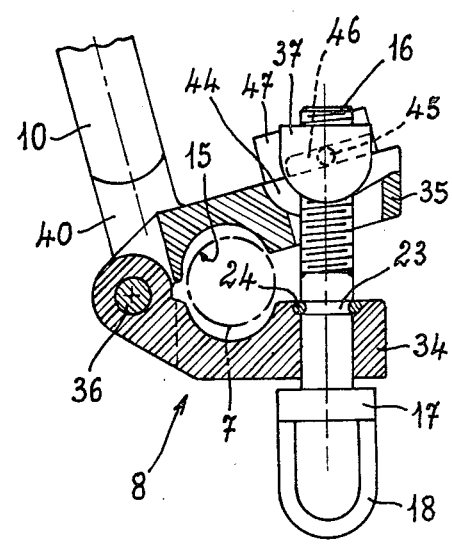

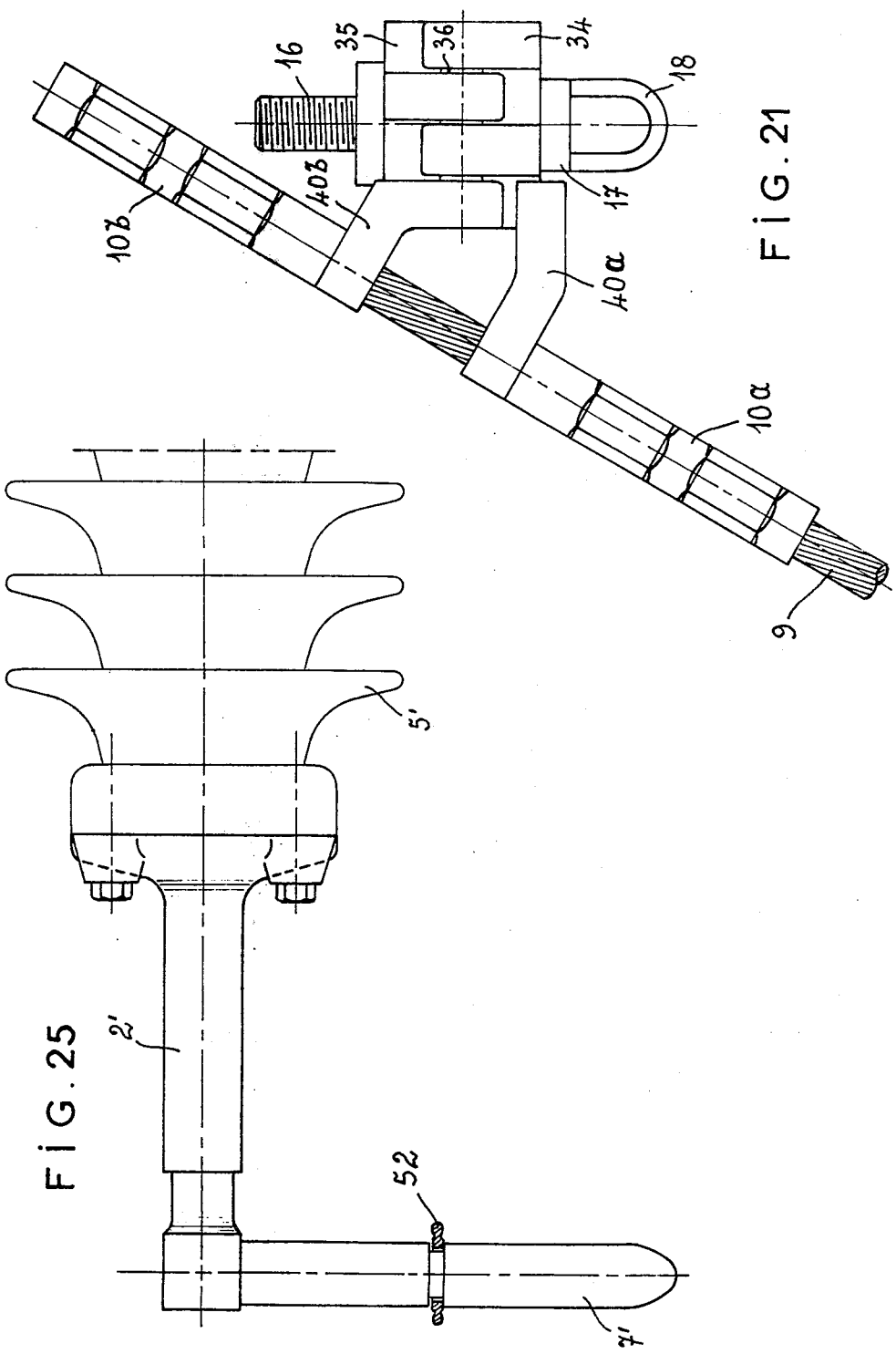

CABLE CONNECTOR

FIELD OF THE INVENTION

My present invention relates to a device for connecting two electric lines and, more particularly, to a cable connector adapted to electrically and mechanically connect another cable (tap or feeder) to an aerial cable. The invention is particularly designed for applications in distribution networks operating at intermediate voltage levels, i.e. voltage levels between the high tension normally transmitted over long distances and the low voltage generally fed to domiciles and commercial and industrial establishments.

BACKGROUND OF THE INVENTION

It is known to provide, in electrical distribution networks, aerial cables or lines which are at a voltage somewhat less than the high tensions transmitted over long distances from generating plants, and taps which feed such aerial cables or draw current therefrom and generally run to other aerial cables or to the ground.

Cable connectors for this purpose may be used, for example, to connect lines running from transformers to the aerial conductors, from the aerial conductors to switches and circuit breakers, from the aerial cable to distribution or other boxes, and from the aerial cable to ground-level distribution systems.

While an obvious method of connection is to splice the tap cable to the aerial cable, the mechanics of such a procedure prevents widespread use since the operation is time-consuming and dangerous because the work may have to be done close to or in contact with a "live" wire.

Other techniques have, of course, been employed. Such techniques may use so-called cable connectors which are tightened by nuts or other clamping devices and which are attached to one of the cables and adapted to receive the other or which can be placed over and can clamp together the two cables.

Such devices generally consist of a simple bolt-tightened clamp.

In other techniques, sleeves can be fitted over one or the other cable and clinched therearound by special tools, the other cable then being inserted into the sleeve and likewise clinched in place.

The systems can be used in the region of an electrical insulator by which the aerial cable is mounted upon a support or at locations between such insulators or supports.

In most instances these devices cannot be used except with a significant possibility of danger to the lineman because the aerial cable generally must be connected to the tap while "hot", i.e. without turning off the voltage.

There have been proposals for cable connectors which can be manipulated from some distance away from the connecting point, e.g. using an electrically insulated pole. In these arrangements, however, the previously described types of cable connectors were employed with, for example, the hexagonal head of a bolt, simply replaced by an eye in which the hook of the pole could engage. Conventional systems of this type, however, were lacking in the desired degree of versatility as to the positioning of the tap vis-à-vis the aerial cable, did not have the desired degree of maneuverability so as to permit the connector to be emplaced or removed with facility; and frequently were less than completely reliable with respect to the mechanical and electrical connection made.

For example, the configurations of the conventional connectors limited access of the pole hook to the eye and occasionally prevented tightening of the connector in a particularly desirable orientation so that each time such a connector was used, the orientation of the connector was frequently a compromise between the optimum position and one which would allow effective tightening.

OBJECTS OF THE INVENTION

It is the principal object of the present invention to provide a device for connecting a tapping cable to an aerial cable, especially for intermediate-voltage electrical distribution networks, whereby the disadvantages of earlier systems, including those enumerated above, can be obviated.

Another object of my invention is to provide an improved cable connector which can be manipulated and oriented optimally from a distance without difficulty and which thereby facilitates mounting and dismounting.

Still another object of the invention is to provide a cable connector for the purposes described which allows a wider range of orientations of the tap cable with respect to the aerial cable but which nevertheless permits a high quality mechanical and electrical connection to be made easily and simply.

SUMMARY OF THE INVENTION

These objects, and others which will become apparent hereinafter, are attained in accordance with the present invention, in a cable connector, especialy for connecting an aerial cable of an intermediate-voltage distribution system to a tap or feeder cable, which comprises a sleeve adapted to receive the first of these cables and to be clamped thereto, the sleeve carrying a foot which projects outwardly therefrom and generally radially, this foot being formed with a cylindrical peg or pin which is electrically connected and rigid with the sleeve, preferably being formed integrally or unitarily therewith.

According to the invention, a connector is provided with an opening adapted to receive this pin and of variable size, controlled by a screw or bolt which can be rotated by means of a shackle or eye and designed to be opened to provide a signficant play around the pin, e.g. of the order of 10% at least of the diameter of the pin, whereby the connector member itself can be tightened on the pin. This connector member, which can assume any desirable angular orientation about the axis of the pin, carries a casing or sheath adapted to receive the second cable, all of the elements described being composed of electrically conductive material.

The invention thus provides a tandem or series assembly which can be mounted with ease and because of the large opening permitted in the clamp member, can enable the latter to lock onto the cylindrical projection or peg with infinite variation of position and excellent electrical contact. Furthermore, the versatility of the system permits it to be used for all types of electrical network connections, e.g. for aerial cable connections to ground installations and other aerial installations, to connection boxes, switch or breaker terminals, to transformer terminals and even to ground lines.

Indeed, wherever a pin-like formation is provided, the clamping member can be mounted and wherever a connection must be made, it is merely necessary to provide the pin or peg on one of the members to be connected while the other member is provided with the clamp.

The clamp, when constructed in the manner described below, is able to provide not only excellent electrical connection but also a strong mechanical link between the two members to be connected. Since the pin or peg is integral with and formed from the same conductive material as the sleeve engaging the first conductor and the clamp is formed in one piece with and from the same conductive material as the sheath or casing for the second conductor, no electrical losses are provided between the clamp or pin and the respective members while the design of the clamp is such that its opening practically embraces the pin, ensuring elimination of uneven contact losses at the connection zone.

The connector of the present invention thus can be considered to consist of two subassemblies, the first formed with a pin while the second is formed with a clamp and either of these assemblies can have various configurations within the precepts of the present invention and can be used with any of the other subassemblies.

For example, the pin subassembly may have a sleeve which lies parallel to the pin but which is offset therefrom, being connected to the pin by a radially extending leg. Preferably, however, the pin extends to an obtuse angle to the leg which is perpendicular to the axis of the sleeve so that the leg and the axes of both the pin and the sleeve are coplanar although the axis of the pin includes an acute angle with the axis of the sleeve.

In order to facilitate access to the clamp, the pin is normally oriented on the underside of the assembly, i.e. lies below the sleeve when the latter is affixed to an aerial cable and/or to a device for anchoring the aerial cable, e.g. via insulators, to a support.

Since the clamp can assume any angular orientation about the axis of the pin, and its opening adapted to receive the pin is offset from the axis of its sleeve or casing (adapted to engage the second cable) it is easy to see that the second cable may run from the ground up to the aerial cable or from a higher position down to the aerial cable, or in any lateral direction, as may be required. For example, the connector can be used to join a lower aerial cable to a higher cable on the same support or another pylon. The axis of the casing or sheath of the clamp subassembly can be skew to the axis of the opening of the clamp, both of the latter axes lying in parallel spaced-apart planes as preferred. Advantageously, the plane of the sheath or casing can include the axis of the bolt.

According to another feature of the invention, the clamp subassembly comprises a threaded rod or bolt, one end of which is formed with the eye or shackle which is engageable by the hook of a pole. This end of the bolt can be free to rotate in one massive body of the clamp while the bolt is threaded into a juxtaposed massive body, the two bodies clamping the pin between them.

This bolt or threaded rod can be provided with means enabling the force spreading of the two bodies by entrainment of the first-mentioned body axially with the screw upon reverse rotation thereof, although it is possible to resiliently connect the two bodies so that they tend to spread apart by intrinsic resilient stress.

Advantageously, the clamp subassembly is used in such position that the shackle or eye is turned downwardly, i.e. the axis of the screw is vertical. This greatly facilitates manipulation of the device via a pole having an open hook at its end engageable in the eye.

An alternative construction for the first assembly, which is particularly effective when the connector is to be used in the region of a junction box or the like, simply provides the pin at right angles to the conductor-receiving sleeve.

The connector subassembly of the invention can also be constructed in a variety of ways within the inventive concept, utilizing intrinsic resiliency to bias the clamp member to its open position, or provided with means associated with the screw, for the forced opening of the clamp.

In one embodiment of the invention, the clamp member comprises a locking collar of generally U-configuration, having an arcuate bight defining the opening with a pair of massive bodies at the free ends of the shanks. The free ends of the shanks are thus separated by a gap bridged by the screw which, upon rotation, allows the ends of the shanks to be drawn together and closes the opening to enable the clamp member to engage the pin. The intrinsic resiliency of the bight biases the shanks apart so that the device springs open upon reverse rotation of the screw.

The bight can form one piece with the shanks or bodies and can be simply a thinner portion unitary with the two massive parts.

In other constructions, the bight can be a laminated strap fixed to the massive boies in a C- or U-configuration.

In this case, the laminate may either be formed as a leaf spring structure, providing the clamp-opening bias, or as a relatively yieldable or flexible material so that means coupled with the screw enables opening of the clamp member.

In all cases, the opening in the clamp member is generally cylindrical and, at least in the open position of the clamp, has a diameter which is at least 10% greater than the diameter of the pin which the opening is designed to receive.

According to still another feature of the invention, the inner surfaces of the opening are channeled to improve the grip of the clamp member upon the pin.

When the bight is formed from a piece different from that forming each of the lugs or massive bodies of the clamp member, it may be soldered, riveted or otherwise connected to these massive bodies.

In the best-mode embodiments of the invention, the screw is provided with means for the forced opening of the clamp so that vibration or other loss of the screw from the assembly once it has been emplaced will not give rise to a spontaneous opening of the clamp and loss of connection.

The means enabling the forced opening of the clamp can include a ring surrounding the threaded rod and adapted to axially entrain a respective side of the clamp member into an open position upon reverse rotation of the screw. The same result can be gained by providing the screw with an annular groove in which a pin engages, this pin being axially coupled to one of the shanks of the clamp member.

According to yet another feature of the invention, the clamp member comprises two articulated parts, two parts which are hinged together, the hinge having an axis generally parallel to the pin adapted to be received in the cylindrical opening defined between these two parts. When two parts of this type are hingedly connected together, a braided cable or other high-conduction path may be provided between the two parts so connected so that any current flow between the two parts need not be confined to the hinge.

High versatility is obtained when the sheath or sleeve, adapted to receive the second cable and to be anchored thereto, is provided with an inwardly biasable collet which can be compressed by the clamp member against the pin. The collet itself, referred to as a "tulip", can be unitary with the sheath but is separate from the clamp member in which it is received. The clamp member can have any of the configurations described. Advantageously, the sheath includes an obtuse angle with the tulip. The angular position of the tulip around the axis of the pin thus can determine the orientation of the sheath and can be locked in place by the clamp. Obviously the clamp can be any of the type previously described and instead of clamping directly onto the pin, will clamp against the tulip and, in turn, clamp the tulip against the pin.

When an articulated construction of the clamp is used, the sheath can be mounted upon one of the two hingedly connected members or a respective sheath can be provided on each member and a connecting conductor can bridge the two members.

In yet another embodiment of this second subassembly, the clamp member comprises a tubular structure having a transverse threaded ball into which a clamp screw is threaded to bear with a shoe against the pin.

In still another construction, a stirrup-shaped support is provided to straddle a locking lever which is urged against the pin by a screw.

BRIEF DESCRIPTION OF THE DRAWING

The above and other objectives, features and advantages of the present invention will become more readily apparent hereinafter, reference being made to the accompanying drawing in which:

FIG. 1 is an elevational view of the cable connector according to the invention showing the attachment of a tap or feeder cable to an aerial cable adjacent an insulator whereby this latter cable is connected to a support;

FIG. 2 is an end view of this cable connector taken through the aerial cable and in the direction of the axis thereof;

FIG. 6 is a cross-sectional view through the clamping portion of a connector member used in a system analogous to that of FIGS. 1 through 5 and showing the interconnection of the two massive bodies adapted to be drawn together by a bolt;

FIG. 7 is a view similar to FIG. 6 illustrating a similarly functioning but structurally different unit of the type shown in FIG. 6;

FIG. 8 is another view similar to FIG. 6 illustrating a further modification;

FIG. 9 is a transverse section through a connector member shown with means for forcing open the clamp (FIGS. 1 through 8 showing clamping members which open by their inherent elasticity);

FIG. 10 is a longitudinal section of a further clamp member with means for forcing open the clamp which differs from that of FIG. 9;

FIG. 11 is a cross-sectional view taken generally along the line XI—XI of FIG. 10;

FIG. 12 is a section corresponding to that of FIG. 9 of a forced-opening clamp according to another embodiment of the invention;

FIG. 17 is a perspective-isometric view of another embodiment of the invention in which the clamping member has two articulated parts;

FIG. 18 is a transverse cross-sectional view through the embodiment of FIG. 17 showing the clamp in its open position;

FIG. 19 is a transverse cross-sectional view through the clamping member of FIG. 17 showing it in its closed position;

FIG. 20 is a transverse section similar to FIG. 18 and illustrating yet another embodiment of an articulated clamp adapted to be used with the present invention;

FIG. 21 is a side view of the clamping member of another embodiment of the invention having two sleeves for receiving the tapping or feeder cable;

FIG. 25 is a side view of a connection box terminal in which the insulator is integrated with a foot provided with the pin which can receive the connectors of FIGS. 1 through 24 as an alternative to the pin construction of FIGS. 1 through 3.

SPECIFIC DESCRIPTION

Figure 3:
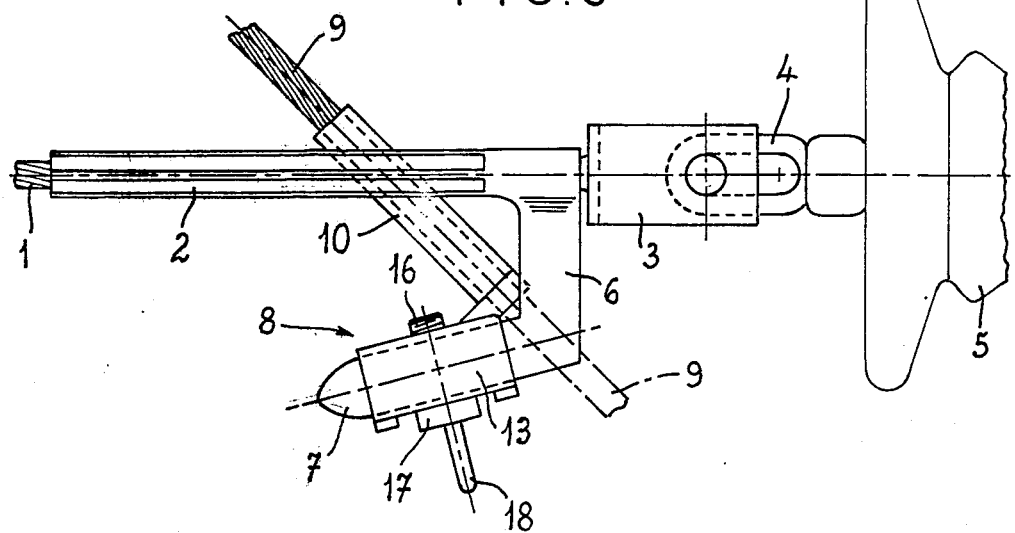
FIG. 3 is a side view of the same device shown with the elements in another operative position.

In FIGS. 1 through 3 of the drawing, I have shown a cable connector according to the invention which is intended to secure and electrically connect an end of a first cable 1, i.e. an aerial cable, to a second cable 9 which can be a feeder or tap.

In the embodiment illustrated in these Figures, the end of the cable 1 to be connected is supported on an upstanding structure such as a post or pylon (not shown) and is anchored thereto by an insulator 5.

The first subassembly of the connector of the present invention, i.e. the pin subassembly comprises a sleeve 2 which is rigid with a cover or head 3 extending beyond the end of the cable 1 and traversed by a pin 3a which enters an elongated slot 4a in an eye 4 affixed to an insulator 5 which is the first of two such insulators identical with one another, the second insulator (not shown) engaging the fixed support or pylon. The head 3 can be of U-cross-section as seen in a sectional plane perpendicular to the plane of the paper in FIG. 1 and through the axis of the sleeve 2.

The sleeve 2 is clenched onto the cable 1 by any conventional clenching tool, preferably one which bears with six jaws against the sleeve to form the six facets thereof illustrated in FIG. 2.

This pin subassembly further comprises a leg or foot 6 which projects readily from the sleeve 2 and can be integral (unitary) therewith, being formed from the same conductive material as the sleeve. For convenience in manipulation, the sleeve 2, the head 3 and the leg 6 are so oriented that the leg 6 extends downwardly. While in the preferred embodiment illustrated the leg 6 is located at the end of the sleeve 2 proximal to the insulator 5 and the head 3, it is also possible within the scope of the present invention for this leg to project from any other point along the length of the sleeve 2, and even from the head 3.

At its free end, the leg 6 is provided with a pin or peg 7 which is cylindrical and has a rounded but somewhat pointed tip 7a to facilitate its insertion into the opening 15 of the second subassembly to be described subsequently.

Preferably, the pin 7 projects from the leg 6 in a direction opposite the head 3 and is inclined somewhat downwardly so that its axis includes an acute angle of, say, the order of 15 degrees, with the axis of the sleeve 2.

The axis of the pin 7 is coplanar with the center of leg 6 and axis of sleeve 2, thus also with the cable 1. The sleeve 2, the leg 6 and the pin 7 are formed as a rigid assembly of a metal which is a good conductor of electricity, e.g. aluminum or copper, and with significant mechanical strength.

A connector member constituting the second subassembly is mounted upon the pin 7 and is represented generally at 8 to connect the cable 9 with the cable 1.

In the most general terms, the connector 8 can be considered to possess an expansible collar into which the pin 7 can be inserted and which has an opening that can be closed on the pin. In addition, this subassembly includes a casing or sheath 10 into which the second cable, i.e. the tap or feeder, can be inserted and locked in place, e.g. by clenching or soldering etc. In any case, the sheath or casing 10 is rigid with and is formed unitarily with at least one part of the expansible collar. The collar and sheath are also composed of a metal which is a good electrical conductor.

Figure 4:
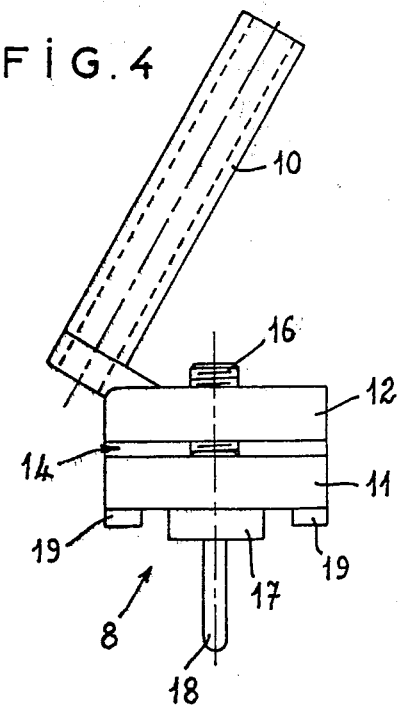
FIG. 4 is a side view, drawn to a slightly larger scale than FIGS. 1 through 3, of the connector member detached from the pin of the assembly of FIGS. 1 through 3.
Figure 5:
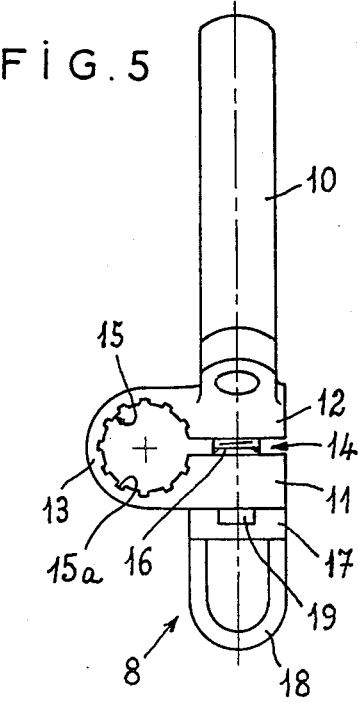
FIG. 5 is an end view of the member shown in FIG. 4.

FIGS. 4 and 5 show in greater detail the construction of the second subassembly which is found in smaller scale in FIGS. 1 through 3.

As FIGS. 4 and 5 show, the clamping collar is constituted by a single metal member having two massive parts 11 and 12 located at the free ends of respective shanks and interconnected by an arcuate bight 13 of reduced thickness so that the assembly has the configuration of a U. The juxtaposed parts 11 and 12 thus define a gap 14 which communicates with a cylindrical recess 15 dimensioned to tightly hug the pin when the clamping member is closed.

The sleeve or sheath 10 is here shown to be unitary with the part 12 into which the screw 16 is threaded, the screw traversing an unthreaded bore in part 11.

When the connector is assembled the pin 7 is simply threaded through the opening 15 whose internal surface is crenellated or channeled at 15a to permit a high degree of deformation and thus a particularly firm anchorage upon the pin affording excellent electrical conduction and mechanical stability.

The clamping means includes a relatively short threaded rod forming the bolt 16 mentioned earlier, which traverses the unthreaded bore in part 11 to threadedly engage the other part 12.

At its extremity below the part 11, the screw 16 is rigid with a cylindrical head 17 carrying a shackle or eye 18 engageable by a hook on a pole of wood or other insulating material.

In a preferred embodiment of the invention, the sheath 10 is mounted upon the shank of the U-shaped clamp opposite that against which the head 17 and the eye 18 bear. The axis of the sheath 10 can be coplanar with the screw axis but advantageously is inclined thereto as has been shown in FIG. 4.

The operation of assembling the connector can be carried out at a distance, e.g. utilizing a pole of the type described to connect a tap or feeder 9 to the cable 1 adjacent its connection to a pylon. In this case, the pole can have an open hook at its free end to engage the shackle 18 and allow the pole to rotate the screw and thereby open or close the clamp. The clamping member is preferably mounted on the pin 7 so that its eye or shackle 18 is turned downwardly, the operation of positioning and tightening or loosening being facilitated by bosses 19 on the part 11 of the collar.

If the clamping member is mounted upon the pin 7 in its position shown in FIG. 1, the cable 9 can extend downwardly toward cable 1. Or, as shown in broken lines, can run downwardly from the cable 1. Any oblique orientation is permitted by rotating the clamping assembly about the pin axis (compare the solid and broken lines of FIG. 2).

Instead of being formed in a single piece the clamping collar 8 can be fabricated in three pieces, namely, two metallic blocks 11' and 12' and a metal laminate 13' as has been shown in FIGS. 6 through 8.

The two blocks 11' and 12' correspond to the massive parts 11 and 12 previously mentioned and are separated by a gap bridged by a bolt 16 passing freely through a bore in block 11' and threaded into a tap hole in the block 12'. In these embodiments the laminate 13' can simply constitute a flexible part interconnecting the blocks 11' and 12' and constituting straps adapted to brace the pin against the blocks 11' and 12'.

In the embodiment of FIG. 6, the strap 13' is of U-section with ends soldered at 21 to the blocks 11' and 12', the cylindrical opening 15 being defined partially by the strap 13' and partially by curved faces 12a' and 11a' of the blocks 12' and 11' respectively.

In the embodiment of FIG. 7, the strap 13' has the configuration of a C whose ends at 21 are soldered to the blocks 11' and 12' or which has its outer surfaces sweat-soldered to these blocks. Here the cylindrical opening 15 is defined exclusively by the strap 13'.

FIG. 8 is analogous in function to FIG. 6, except that the free ends of the strap 13' are connected by both soldering at 21' and riveting at 22 with the respective massive bodies 11' and 12'. In this embodiment the cylindrical opening 15 is defined partly by the strap 13' and partly by the curved facets or blocks 11' and 12'.

In FIGS. 6 through 8 the clamping members each have a threaded rod 16 rigid with a head 17 engaging an annulus or shackle 18 able to be engaged by a hook on the pole to rotate the screw and close the clamping members. The clamping members of FIGS. 6 through 8 may also be provided with the forced opening devices of FIGS. 9 through 12 described below.

The clamping assembly 8 shown in FIG. 9 provides the threaded bolt 16 with an annular groove 23 in which a split ring 24 is received, a split ring of this type being known as a "circlip". The ring 24 bears against an inner face of the shank 11 and serves to draw this shank away from the shank 12 when the bolt is rotated in a sense opposite its clamping sense. Thus the clamp can be forced open.

In the modification of FIG. 10, which also shows a forced-opening clamp, the annular groove 23' of the bolt 16 is provided within the shank 11 and receives the pin inserted tangentially and represented at 25 to lock the bolt against axial movement relative to the shank 11 while permitting its free rotation. Here again, reverse rotation of the bolt spreads the shanks apart. It is possible, as can be seen from FIG. 11, to thereby spread the opening 15 to a diameter at least 10% greater than the diameter of the pin which has been represented in dot-dash lines in this Figure. Since the pin 25 has a diameter less than the axial width of the groove 23', the shank 11 can cant (tilt) relative to the bolt (FIG. 11) to permit such opening.

The clamp of FIG. 12 comprises a lug 27 fixed to the external surface of the shank 11 and engaging an annular groove 26 which is formed in the head 17 of the bolt. Here again reverse rotation of the bolt axially spreads apart the two shanks in a manner analogous to that which applies for FIGS. 9 through 11.

Figure 13:
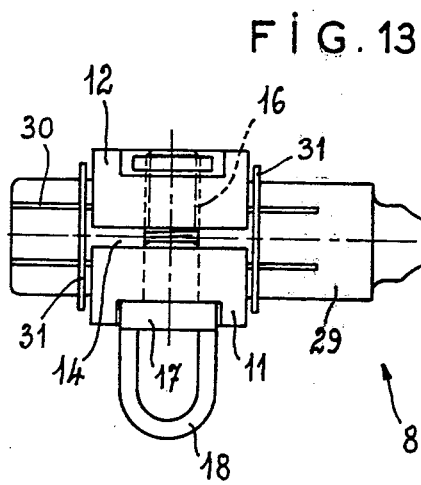
FIG. 13 is a side-elevational view of a tulip-type connector embodying the invention.
Figure 14:
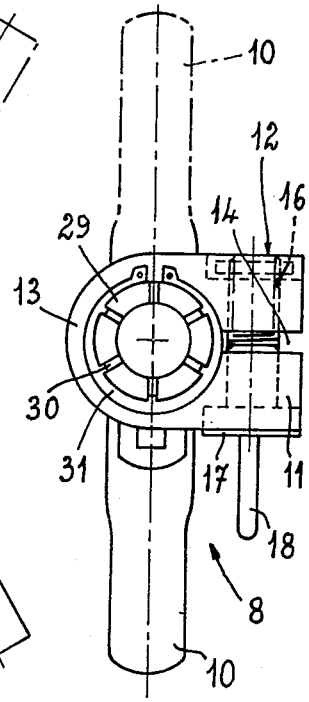
FIG. 14 is an end view thereof.

FIGS. 13 and 14 show still another clamping subassembly, here consisting of two parts and referred to as a tulip assembly because of the configuration of the collet which is used.

In this embodiment, the clamp, as previously described, is a U-shaped member with massive shank ends 11 and 12 separated by a gap 14 and connected by the curved bight or web 13 of lesser thickness. These parts define a cylindrical opening whose inner surface is channeled as previously described. A threaded bolt 16 rotates freely in a bore of shank 11 and threadedly engages a tap bore in shank 12 while being provided with a head 17 from which the eye 18 projects.

In this embodiment, however, the sheath 10, which is adapted to receive and be clamped to the second cable, i.e. the tap or feeder, is connected to a split sleeve or collet 29, also referred to as a tulip, by an elbow 28.

The tulip 29 is a sleeve formed with axial splits or gaps 30 which open at the end of the sleeve opposite the elbow 28. The tulip is introduced into the cylindrical opening of the collar 11–13 and is axially fixed thereon between a pair of split rings 31 of the circlip type seated in grooves (not shown) on the tulip.

When the collar is open, the lobes of the split sleeve 29 are sufficiently spread to allow the pin to be received therein. The clamp is then tightened and compresses the collet against the pin to lock the assembly in place in the manner previously described. As can be seen from FIG. 13, the sheath 10 can be oriented through 360° in any direction, i.e. turned downwardly as shown in solid lines or upwardly as shown in dot-dash lines.

Figure 15:
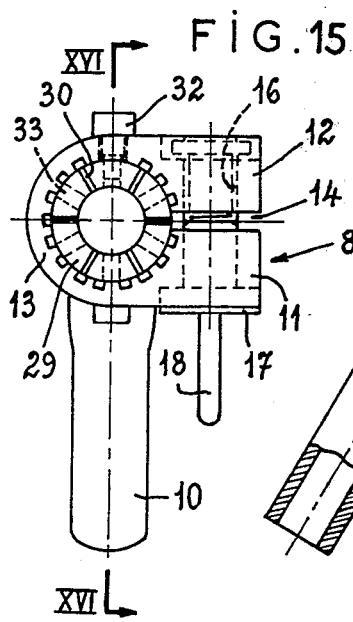
FIG. 15 is an end view of a modified tulip-type connector.
Figure 16:
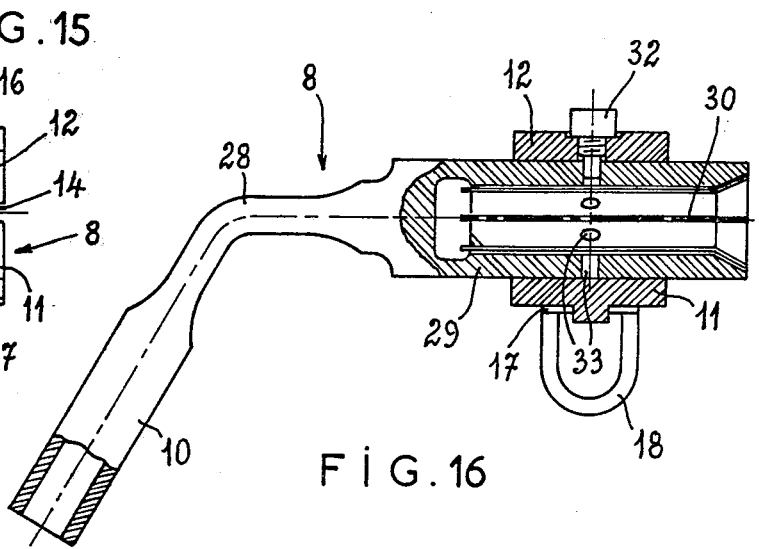
FIG. 16 is a section taken along line XVI—XVI of FIG. 15.

A variant of the tulip collector has been shown in FIGS. 15 and 16 which utilizes the same collar, except that, at the junction between the bight 13 and the end 12 of the upper shank, a screw 32 is provided in a tapped hole. The tulip 29 is here provided with a plurality of angularly spaced radial holes 33 between each pair of axial splits and adapted to receive a pin at the end of the screw 32. The annular orientation of the tulip and the clamp and the axial fixing of the two together is accomplished by selecting the hole 33 into which the screw 32 is set.

FIGS. 17 through 19 show the second subassembly in yet another concept according to the invention. Here the clamp is formed by two metal pieces 34 and 35 and articulated at a hinge represented at 36. The members 34 and 35 thus form the jaws of a hinge-type clamp separated from one another by a gap 14 and provided with semicylindrical recesses which together form the opening 15 adapted to receive the pin. The tightening means is a threaded screw 16 formed as previously described with a head 17 and an actuating shackle 18.

The screw 16 passes freely through a hole in the member 34 and is provided with an annular groove 23 receiving the split ring 24 adapted to draw the jaws apart for opening of the clamp. The threaded portion of the bolt engages a nut 37 having a curved surface cooperating with the outer face of shank 35 and formed with a slot 38 in which a lug or pin 39 projecting from the shank 35 engages, thereby preventing rotation of the nut.

The sheath 10 is connected mechanically and electrically with member 35 by a short foot 40 and this is inclined to the axis of the opening 15.

As can be seen from FIG. 18, an electrical connection between members 34 and 35 can be effected by flexible conductor, e.g. a braid 41 of aluminum whose ends are soldered to bosses 42 and 43 on the members 34 and 35. As is also apparent from FIG. 18, a particularly wide opening can be provided with this clamp which is placed over the pin shown in dot-dash lines at 7 and the clamp in the manner previously described. Obviously a tulip can be clamped by this structure against the pin as well, if desired, the tulip carrying the sheath 10 or another sheath equivalent thereto.

FIG. 20 shows a variant of the embodiment in which the clamp is formed by two articulated pieces 34 and 35, enabling a large opening to be formed. In this case the nut 37 engaged by the threaded bolt 16 has a lower curved surface which is received in a recess 44 in member 35. The lateral faces of this nut are provided with lugs 45 engaging in grooves 46 formed in a boss 47 of member 35. The bosses 47 flank the recess 44. Thus the nut is trapped against axial movement and is prevented from rotating.

Another articulated structure is shown in FIG. 21 in which, instead of a single sheath 10 to receive the second cable, two sheaths 10a and 10b are provided and are disposed coaxially when the clamp is tightened. The first sheath 10a is connected by a foot 40a to one member 34 while the second sheath 10b is connected by a foot 40b to member 35. The tapping cable 9 is inserted in and clamped to both the sheaths so that electrical connection to both parts 34 and 35 is guaranteed without the braid 41 previously described. The means for tightening and opening the clamp is identical to any of those which have already been discussed.

Figure 22:
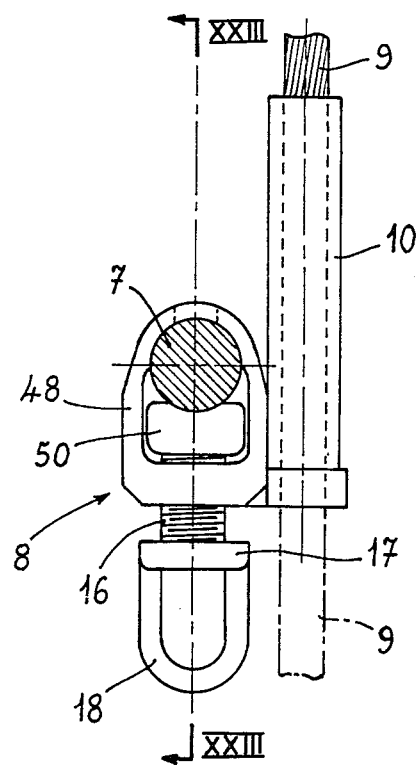
FIG. 22 is an end view showing another type of clamp arrangement embodying the invention.
Figure 23:
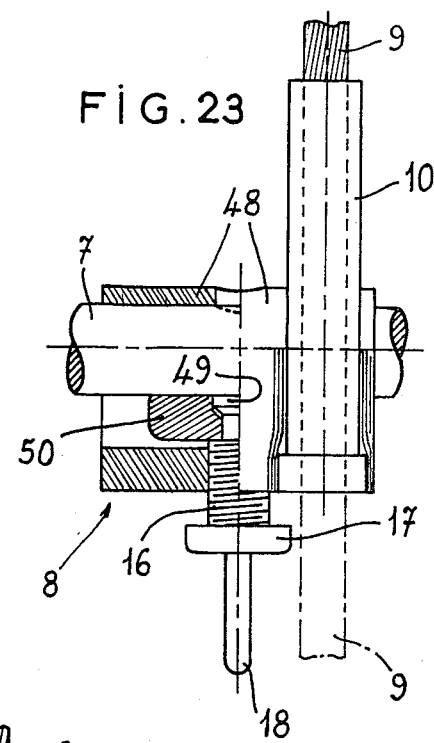
FIG. 23 is an elevational view, partially in section, along line XXIII—XXIII of FIG. 22.

In the embodiment of FIGS. 22 and 23, the clamp body 48 is of a generally tubular configuration and rigid with the sheath 10 which can receive the cable 9. The threaded bolt 16 is screwed into a tapped bore of body 48 and has at one end the previously described head 17 with an eye or shackle 18.

Figure 24:
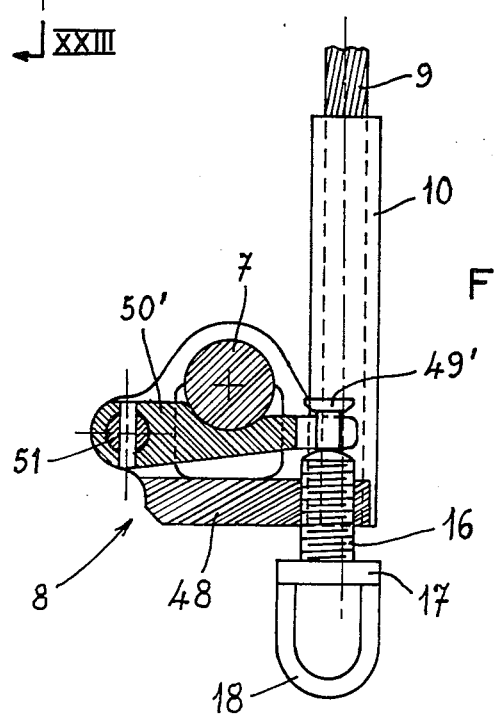
FIG. 24 is a transverse section through a connecting member in accordance with another embodiment of the invention.

The other end of the screw has an enlargement 49 enabling it to retain a shoe 50 within the body 48 and to press this shoe against the pin 7. The shoe 50 is elongated parallel to the pin 7 and has a cylindrical recess which bears over a significant area against the pin. The opposite side of the tube 48 is cylindrically rounded to brace the pin against the force applied by the shoe 50. A mechanical advantage as to the tightening force can be gained by the modification shown in FIG. 24 in which the shoe 50' is a lever fulcrumed on a pin 51 and pressed by the bolt 60 at its opposite end. A cylindrical recess in this lever engages the pin 7. A head 49' of the bolt 16 allows the fork at the free end of the lever to be engaged so that reverse rotation of the screw loosens the clamp.

While the invention has been described primarily as applicable to the connection of a second cable to an aerial cable in the region in which the latter is anchored to a support, it is also applicable to connection of a cable to a terminal box having a single insulator as represented in FIG. 25. In this case, the first subassembly comprises a sleeve 2' bolted to an insulator 5' and receiving one end of the first cable. The pin 7' extends at right angles to the sleeve 2' and a ring 52 is mounted on the pin 7' to limit the depth to which the pin is inserted into one of the clamping members of FIGS. 1 through 24.

The present invention is thus applicable to diverse cable connectors and to the connection of cables to various nets or accessories utilized in electrical networks and especially aerial distribution networks. It may be used in the region of anchoring systems or terminal boxes, aerial circuit breakers or pole-mounted transformers. The system may be used wherever a pin is provided or can be provided although preferably makes use of one of the pin assemblies of FIGS. 1 through 3 or 25.

I claim:

1. A device for connecting a first electrical cable to a second electrical cable, comprising:
   a first member formed with a sleeve adapted to receive and engage said first cable, and a cylindrical pin connected to said sleeve but offset from the axis thereof;
   a second member formed with an expandable opening and adapted to receive said pin, said second member being formed with a sheath adapted to receive and engage said second cable; and
   clamping means adapted to close said opening around said pin and anchoring said sheath to the first member, said first member and said second member being composed of electrically conductive material whereby the clamping of said second member around said pin electrically interconnects and mechanically connects said cables.

2. The device defined in claim 1 wherein said sheath has an axis offset from the axis of said opening.

3. The device defined in claim 2 wherein said pin is connected to said sleeve by a conductive foot extending perpendicular to said sleeve, said pin projecting transversely to said foot and the axes of said pin and said sleeve being coplanar with said foot.

4. The device defined in claim 3 wherein the axis of said pin includes an acute angle with the axis of said sleeve, said pin being formed on an end of said foot remote from said sleeve.

5. The device defined in claim 2 wherein said clamping means includes a threaded bolt having a head formed with a shackle adapted to be engaged by a hook on a pole.

6. The device defined in claim 5 wherein said second member includes a collar having a pair of shanks with ends spanning by said bolt and defining inwardly of said ends said opening.

7. The device defined in claim 6 wherein said second member includes an electrically conductive split-sleeve collet encircled by said collar and clamped against said pin, said sheath being fixed to said collet.

8. The device defined in claim 6 wherein the interior of said collar forms said opening directly and bears directly against said pin.

9. The device defined in claim 6 wherein said shanks are resiliently biased away from one another by elastic deformation of the collar upon clamping of said second member against said pin.

10. The device defined in claim 6, further comprising means effective upon rotation of said bolt to spread said shanks apart and enlarge said opening.

11. The device defined in claim 6 wherein said collar has a generally U-section and is provided with a curved bight connecting said shanks and defining at least in part a cylindrical opening having a diameter prior to clamping of said collar around said pin of at least 10% in excess of the diameter of said pin, said bolt traversing an unthreaded bore in one of said shanks and being threaded into a tapped bore provided in the other shank, said sheath being rigidly connected and fixed to said collar.

12. The device defined in claim 11 wherein said bight and said shanks are formed unitarily from a single metal piece.

13. The device defined in claim 11 wherein said bight is a flexible strip individually connected mechanically and electrically to said shanks.

14. The device defined in claim 11, further comprising means on said bolt engageable with one of said shanks for entraining it away from said other shank upon rotation of said bolt in one direction.

15. The device defined in claim 14 wherein the means on said bolt includes a ring axially anchored to said bolt.

16. The device defined in claim 14 wherein said means on said bolt includes an annular groove formed in said bolt in the region of said one of said shanks, and an element insertable into said one of said shanks and engageable in said groove.

17. The device defined in claim 14 wherein said bolt is provided with an annular groove, said one of said shanks being provided with a lug engageable in said groove.

18. The device defined in claim 7 wherein said collet is provided with a pair of axially spaced rings positioning said collar between them.

19. The device defined in claim 7 wherein said collet is provided with a plurality of angularly spaced holes, said collar having a screw receivable in one of said holes to position said collar relative to said collet.

20. The device defined in claim 6 wherein said shanks are formed upon respective hingedly connected clamp members, said sheath being rigidly connected to one of said clamp members.

21. The device defined in claim 20 wherein said bolt acts upon said shank through the intermediary of a nut bearing against said other shank at a curved surface.

22. The device defined in claim 20, further comprising an electrical conductor anchored to each of said clamp members.

23. The device defined in claim 20, further comprising another sheath engageable with said second cable and connected to the other of said clamp members.

24. The device defined in claim 5 wherein said second member comprises a tube rigid with said sheath, said bolt being threaded into a wall of said tube and bearing upon said pin with a shoe.

25. The device defined in claim 24 wherein said shoe is axially aligned with said bolt.

26. The device defined in claim 24 wherein said shoe is a lever pivoted at one end and engaged by said bolt at its opposite end.

* * * * *